United States Patent
Whiteside et al.

(10) Patent No.: US 12,288,218 B2
(45) Date of Patent: Apr. 29, 2025

(54) SYSTEM AND METHOD FOR VERIFICATION OF AIRBAG DESTRUCTION

(71) Applicant: Rebuilders Automotive Supply Co., Inc., Coventry, RI (US)

(72) Inventors: Jesse Whiteside, Portsmouth, RI (US); Paul D'Adamo, Hampstead, NH (US); Kathryn Schmitt, Austin, TX (US); David McLaughlin, Warwick, RI (US)

(73) Assignee: Rebuilders Automotive Supply Co., Inc., Coventry, RI (US)

( * ) Notice: Subject to any disclaimer, the term of this patent is extended or adjusted under 35 U.S.C. 154(b) by 130 days.

(21) Appl. No.: 17/349,685

(22) Filed: Jun. 16, 2021

(65) Prior Publication Data
US 2022/0405768 A1  Dec. 22, 2022

(51) Int. Cl.
| | |
|---|---|
| *G06Q 30/014* | (2023.01) |
| *G06Q 10/087* | (2023.01) |
| *G06Q 10/20* | (2023.01) |
| *G06T 7/00* | (2017.01) |
| *H04W 4/02* | (2018.01) |
| *H04W 4/021* | (2018.01) |

(52) U.S. Cl.
CPC ......... *G06Q 30/014* (2013.01); *G06Q 10/087* (2013.01); *G06Q 10/20* (2013.01); *G06T 7/0004* (2013.01); *H04W 4/021* (2013.01); *H04W 4/023* (2013.01)

(58) Field of Classification Search
CPC .... G06Q 30/014; G06Q 10/087; G06Q 10/20; G06T 7/0004; H04W 4/021; H04W 4/023

USPC ......................................................... 705/303
See application file for complete search history.

(56) References Cited

U.S. PATENT DOCUMENTS

| | | | |
|---|---|---|---|
| 7,995,117 B1* | 8/2011 | Bonn ................. | H04N 1/32128 348/231.3 |
| 10,325,420 B1* | 6/2019 | Moon ..................... | G07C 5/006 |
| 2002/0044690 A1* | 4/2002 | Burgess ................. | G06F 16/29 382/209 |
| 2006/0132291 A1* | 6/2006 | Dourney, Jr. .......... | G06Q 99/00 348/148 |

(Continued)

OTHER PUBLICATIONS

"Vehicle Part Detection and Analytics for Recall", IP.com: IPCOM000261094D, The IP.com Journal, Published on Jan. 28, 2020. (Year: 2020).*

*Primary Examiner* — Wenren Chen
(74) *Attorney, Agent, or Firm* — Nixon Peabody LLP

(57) ABSTRACT

A method includes receiving information indicative of a first vehicle identification number (VIN) for a first vehicle, determining that the first vehicle includes a first recalled component by comparing the first VIN to information in a recall database stored in a memory of an auditing system, receiving first image data generated by a mobile device, the first image data being reproducible as a first image of the first VIN on the first vehicle and associated with a first location of the mobile device, receiving second image data generated by the mobile device, the second image data being reproducible as a second image of at least a portion of the first recalled component and associated with a second location of the mobile device, and validating a status of the first recalled component by comparing the first location of the mobile and the second location of the mobile device.

11 Claims, 11 Drawing Sheets

(56) References Cited

U.S. PATENT DOCUMENTS

| | | | |
|---|---|---|---|
| 2008/0067792 A1* | 3/2008 | Breed | B60R 21/214 |
| | | | 280/734 |
| 2012/0185399 A1* | 7/2012 | Draper | G06Q 10/08 |
| | | | 705/303 |
| 2015/0066782 A1* | 3/2015 | Vainberg | G06Q 10/20 |
| | | | 705/305 |
| 2015/0242803 A1* | 8/2015 | Morby | G06Q 10/087 |
| | | | 705/28 |
| 2019/0012394 A1* | 1/2019 | Endras | G06Q 30/0278 |
| 2021/0065468 A1* | 3/2021 | Chung | G07C 5/008 |

* cited by examiner

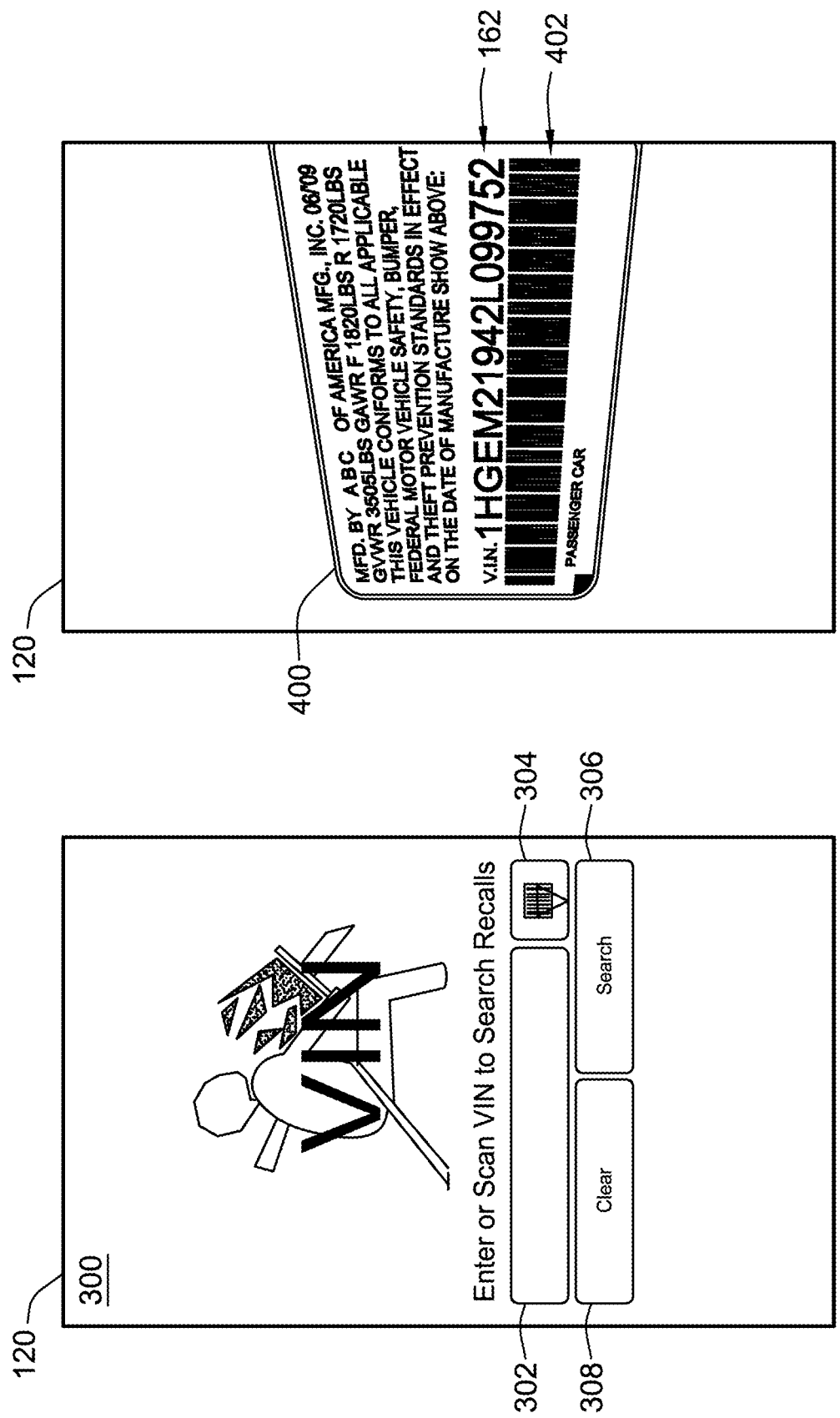

FIG. 10

RAS Preflight Review — 1000

Dashboard

Review Pending PO List

| S# | PO# | Vendor Code | Vendor | Part Cnt | Created Date | Recv Date | Status |
|---|---|---|---|---|---|---|---|
| | Search | Search | Search | Search | Search | Search | Search |

| Select | Map | VIN | Year | Make name | Model Name | Airbag Side | Stock Number | Price | Business Rule | Deduction | Notes |
|---|---|---|---|---|---|---|---|---|---|---|---|
| | | Search | Search | Search | Search | Search | Search | Search | | | |
| ☑ | ⊠ | 1FTKR1AD9BPA05715 | 2011 | XYZ | Model 2 | Passenger | NPA1008041091 | $60.00 | ○ | select ▾ | ☐ |
| ☑ | ⊠ | 1HGEM21942L099752 | 2008 | ABC | Model 1 | Passenger | 15-FOR0022 | $60.00 | ○ | select ▾ | ☐ |

1010, 1020, 1032, 1034, 1036, 1038, 1040, 1042, 1044, 1046, 1048, 1050

134

SYSTEM AND METHOD FOR VERIFICATION OF AIRBAG DESTRUCTION

TECHNICAL FIELD

The present disclosure relates generally to systems and methods for verifying the status of recalled components, and more particularly, to systems and methods for verifying the status of recalled airbags.

BACKGROUND

Vehicle manufacturers and/or government agencies often issue recalls for vehicles containing defective or unsafe components so that those components can be repaired or replaced (e.g., by a vehicle dealership). A single recall could implicate tens of millions of vehicles. To incentivize third parties to aid in returning all of the recalled components, vehicle manufacturers may offer compensation for the removal, destruction, return, and/or collection of recalled components (e.g., recalled airbags). However, many recalled components (e.g., airbags) are not marked with a unique identifier from which participants in these programs can validate whether a given component that is removed from the vehicle is the actual recalled component. The present disclosure is directed to solving these and other problems.

SUMMARY

According to some implementations of the present disclosure, a method of verifying a status of a recalled component includes receiving information indicative of a first vehicle identification number (VIN) associated with a first vehicle, determining that the first vehicle includes a first recalled component based at least in part on the first VIN, receiving first image data generated by a mobile device, the first image data being (i) reproducible as an image of the first VIN associated with the first vehicle and (ii) associated with a first location of the mobile device, receiving second image data generated by the mobile device, the second image data being (i) reproducible as an image of at least a portion of the first recalled component and (ii) associated with a second location of the mobile device, and validating a status of the first recalled component by comparing the first location of the mobile device that is associated with the first image data with the second location of the mobile device that is associated with the second image data.

According to some implementations of the present disclosure, a method of verifying a status of a recalled component includes receiving information indicative of a vehicle identification number (VIN) of a vehicle; determining that the vehicle includes a recalled airbag by comparing the VIN to a recall database; causing indicia to be displayed on a display of a mobile device, each of the indicia being indicative of a corresponding one of a plurality of dispositions for the recalled airbag; receiving a selection of a first one of the indicia indicative of a first disposition of the recalled airbag; using a camera of a mobile device, causing first image data reproducible as an image that at least includes the VIN of the vehicle to be generated, using a camera of a mobile device, the first image data being associated with a first location of the mobile device; using the camera of the mobile device, causing second image data reproducible as an image that at least includes a portion of the recalled airbag to be generated, the second image data being associated with a second location of the mobile device; validating a status of the recalled airbag by comparing the second location associated with the second image data with the first location associated with the first image data; and transmitting (i) information indicative of the VIN, (ii) information indicative of the disposition of the recalled airbag, (iii) the first image data, (iv) the second image data, or (v) any combination of (i), (ii), (iii), and (iv) to a remote auditing system.

According to some implementations of the present disclosures, a method includes receiving information describing a first inventory of vehicles, the information including at least one unique identifier for each of the vehicles in the first inventory and a geo-fence boundary for the first inventory of vehicles; identifying a first vehicle in the first inventory as being associated with a recalled component by comparing the at least one unique identifier of each of the vehicles in the first inventory to a recall database; transmitting information indicative of the identified first vehicle in the first inventory of vehicles to a third party; receiving, from a mobile device, first image data reproducible as a first image of at least a portion of the first vehicle, the first image data being associated with a first location of the mobile device; and validating a status of the recalled component by comparing the first location associated with the first image data with the geo-fence boundary for the first inventory of vehicles.

According to some implementations of the present disclosure, a method includes receiving information describing a first inventory of vehicles, the information including at least one unique identifier for each of the vehicles in the first inventory and a first geo-fence boundary for the first inventory of vehicles; receiving information describing a second inventory of vehicles, the information including at least one unique identifier for each of the vehicles in the second inventory and a second geo-fence boundary for the second inventory of vehicles; identifying one or more vehicles in the first inventory, the second inventory, or both, as being associated with one or more recalled components; receiving, from a mobile device, (i) image data reproducible as one or more images of at least a portion of a first vehicle, the image data being associated with a location of the first vehicle and (ii) information indicative of a unique identifier for the first vehicle; and automatically validating a status of the one or more recalled components associated with the first vehicle by comparing (i) the associated location of the first vehicle and (ii) the unique identifier of the first vehicle with the information describing the first inventory of vehicles, the information describing the second inventory of vehicles, or both.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 3 illustrates user-selectable elements for inputting a vehicle identification number displayed on a display device of a mobile device of the system of FIG. 1, according to some implementations of the present disclosure;

FIG. 4 illustrates an image of a vehicle identification sticker displayed on the display device, according to some implementations of the present disclosure;

FIG. 10 illustrates an exemplary dashboard displayed on a display device of an auditing system of the system of FIG. 1, according to some implementations of the present disclosure;

Figure 1:
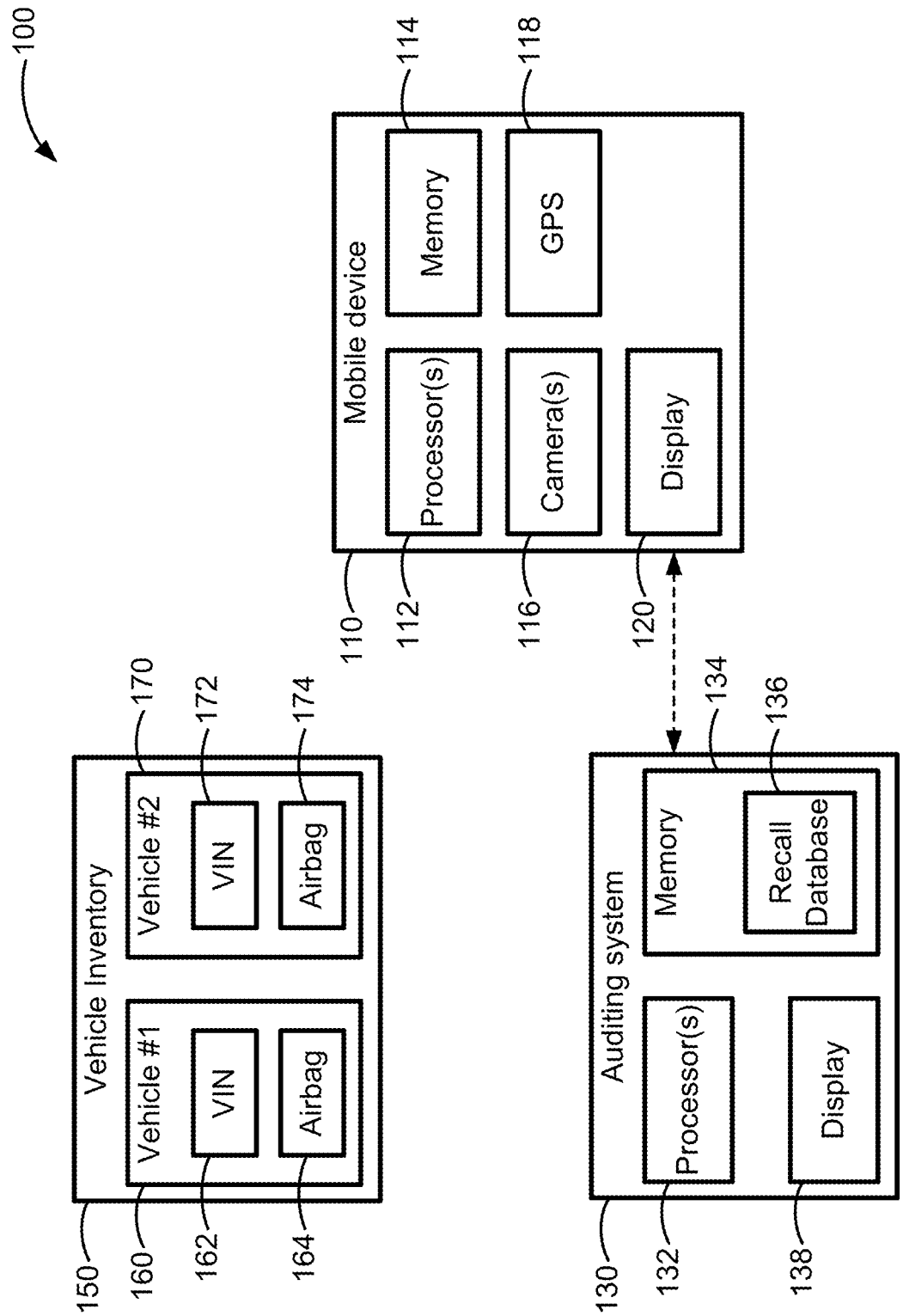
FIG. 1 is a functional block diagram of a system for verifying the status of one or more recalled vehicle components, according to some implementations of the present disclosure.

While the present disclosure is susceptible to various modifications and alternative forms, specific implementations thereof have been shown by way of example in the drawings and will herein be described in detail. It should be understood, however, that it is not intended to limit the present disclosure to the particular forms disclosed, but on the contrary, the intention is to cover all modifications, equivalents, and alternatives falling within the spirit and scope of the present disclosure as defined by the appended claims.

DETAILED DESCRIPTION

Vehicle manufacturers and/or government agencies often issue recalls for vehicles (e.g., passenger vehicles, trucks, motorcycles, etc.) containing defective or unsafe components such as air bags, seat belts, car seats, tires, brakes, gas pedals, suspensions, etc. Typically, the component(s) subject to a recall are replaced or repaired (e.g., by a vehicle dealership) so that the vehicle can return to normal use. It is desirable that every vehicle subject to a recall is either repaired or removed from service to minimize the risks necessitating the recall. However, in some instances, a single recall could affect tens of millions of vehicles. To aid in addressing as many recalled vehicles as possible, vehicle manufacturers may offer incentives or compensation for the removal, destruction, return, and/or collection of the recalled components.

As described herein, one example of a recalled vehicle component is an airbag. One recent airbag recall involving defective airbag inflators implicated over 40 million vehicles. To address the tens of millions of airbags subject to this recall, some vehicle manufacturers are offering third parties compensation for the removal, return, destruction, and/or collection of these airbags. Motor vehicles can be uniquely identified using a vehicle identification number or "VIN," which is a code containing alphanumeric text that is uniquely assigned to each vehicle when manufactured. In contrast, many recalled components, including airbags, are not marked with a unique identifier. This lack of unique identifiers on recalled components poses difficulties when attempting to verify whether a given component that is removed from the vehicle is in fact a recalled component that is eligible for compensation. Without such verification, individuals may be able to submit claims for compensation by providing an airbag from one vehicle that is not eligible for compensation while claiming that the airbag comes from a different vehicle that is eligible for compensation.

In some cases, compensation may be offered under these programs upon proof that a recalled component is missing or removed from the vehicle. Typically, photographs of the vehicle showing that the component is missing are provided as proof for these compensation claims. However, it is difficult to verify whether the photograph of the missing components corresponds to the correct vehicle. For example, it is difficult (sometimes impossible) to determine whether a given photograph of a missing airbag is actually a photograph of the vehicle that is eligible for compensation. Because of this difficultly in verifying the photographs, one could potentially submit photographs of one vehicle showing a missing component that is not eligible for compensation, but claim compensation for a completely different vehicle. Further, one may be able to reuse the same photograph of a missing airbag many times to claim compensation for different vehicles.

Referring to FIG. 1, a system 100 for verifying a status of one or more recalled vehicle components (e.g., an airbag) includes a mobile device 110 and an auditing system 130. The system 100 can be used, for example, to verify the status of recalled components in vehicles in a vehicle inventory 150.

The vehicle inventory 150 includes a first vehicle 160 and a second vehicle 170. The first vehicle 160 has a first unique vehicle identification number (VIN) 162 and one or more recalled components, in this example, one or more recalled airbag components 164. The one or more recalled airbag components 164 can include, for example, a driver-side airbag, a passenger-side airbag, or both. Similarly, the second vehicle 170 has a second unique vehicle identification number (VIN) 172 (which is different than the first VIN 162) and one or more recalled components, in this example, one or more recalled airbag components 174. While the vehicle inventory 150 is shown and described herein as having two vehicles (first vehicle 160 and second vehicle 170), more generally, the vehicle inventory 150 can include any number of vehicles (e.g., 1 vehicle, 20 vehicles, 100 vehicles, 500 vehicles, 1,000 vehicles, 5,000 vehicles, 100,000 vehicles, 1,000,000 vehicles, 12,000,000 vehicles, etc., or any other number of vehicles). The vehicle inventory 150 can include vehicles physically located in, for example, one or more salvage yards, one or more junk yards, one or more used car lots, one or more new car lots, one or more parking garages, or any combination thereof.

The mobile device 110 includes one or more processors 112 (hereinafter, processor 112), a memory device 114, one or more cameras 116 (hereinafter, camera 116), a GPS sensor 118, and a display 120. The mobile device 110 can be, for example, a smart phone, a tablet, a laptop, or the like. The processor 112 can be a general or special purpose processor or micro-processor. The memory device 114 generally contains processor-executable instructions that when executed by the processor 112 causes the processor 120 to actuate and/or control the various components of the mobile device 110 (e.g., update the display 120, actuate the camera 116, etc.).

The camera 116 of the mobile device 110 generates or obtains image data reproducible as one or more images (e.g., still images, video images, or both). The image data reproducible as the image(s) includes associated metadata, which includes information describing and/or providing information about the image (e.g., creation date and/or time, creation location, information relating to the camera 116 and/or the mobile device 110, information relating to the user of the mobile device 110, etc.). The image data generated by the camera 116 can be stored in the memory device 114.

The global positioning system (GPS) sensor 118 is configured to determine a current location of the mobile device 110 (e.g., expressed in latitude and longitude, or other coordinates) based on GPS signals. Alternatively, the mobile device 110 can determine its current location based on RF (e.g., cellular) signals. Information indicative of the determined current location of the mobile device 110 from the GPS sensor 118 can be stored in the memory device 114. More specifically, the image data from the camera 116 that is stored in the memory device 114 can be associated with the current location of the mobile device 110 when the image data was generated (e.g., the location information from the GPS sensor 118 is stored in the metadata for the image). This process of associating the image(s) generated or obtained from the camera 116 with the location information from the GPS sensor 118 is often referred to as geo-tagging.

The display device 120 is generally used to display image(s) including still images, video images, or both. In some implementations, the display device 120 acts as a human-machine interface (HMI) that includes a graphic user interface (GUI) configured to display the image(s) and an input interface. For example, the display 120 can display images generated by the camera 116 and/or alphanumeric text. The display 120 can be an LED display, an OLED display, an LCD display, or the like. The input interface can be, for example, a touchscreen or touch-sensitive substrate, a mouse, a keyboard, or any sensor system configured to sense inputs made by a human user interacting with the display device 120. Thus, the display 120 can display one or more user-selectable icons or elements that can be selected by a user of the mobile device 110 (e.g., by touching the icon or element, clicking on the icon or element, etc.).

While the system 100 is described and shown herein as including one mobile device 110, in some implementations, the system 100 includes a plurality of mobile devices that are the same as, or similar to, the mobile device 110 (e.g., two mobile devices, five mobile devices, ten mobile devices, etc.)

The auditing system 130 includes one or more processors 132 (hereinafter, processor 132), a memory device 134, and a display device 138. The processor 132 is the same as, or similar to, the processor 112 of the mobile device 110. The memory device 134 is the same as, or similar to, the memory device 114 of the mobile device 110. The memory device 134 of the auditing system 130 differs from the memory device 114 in that the memory device 134 stores a recall database 136. The recall database 136 generally includes information about recalled vehicle components (e.g., airbags). Specifically, the recall database 136 includes information linking certain recalled vehicle components to unique vehicle identification numbers (VINs). The information in the recall database 136 can be sourced from vehicle manufacturers or a government agency, for example. The display device 138 can be the same as, or similar to, the display device 120 of the mobile device 110 and is configured to display images (e.g., images from the camera 116 of the mobile device 110).

In some implementations, the auditing system 130 is a mobile device that is the same as, or similar to, the mobile device 110. In other implementations, the auditing system 130 is a server, a desktop computer, a laptop computer, a tablet, or any combination thereof. Alternatively, the auditing system 130 can be implemented using a distributed (e.g., cloud-based) computing system.

The auditing system 130 is able to wirelessly communicate with the mobile device 110 over one or more networks (e.g., via a cellular network), such as, for example, one or more WANS, one or more LANS, the Internet, etc. or any combination thereof. For example, the auditing system 130 can receive information stored in the memory device 114 of the mobile device 110 (e.g., image data generated by the camera 116 and associated location information from the GPS sensor 118) and store that information in the memory device 134. The mobile device 110 can also receive information from the auditing system 130 (e.g., information from the recall database 136).

Figure 2:
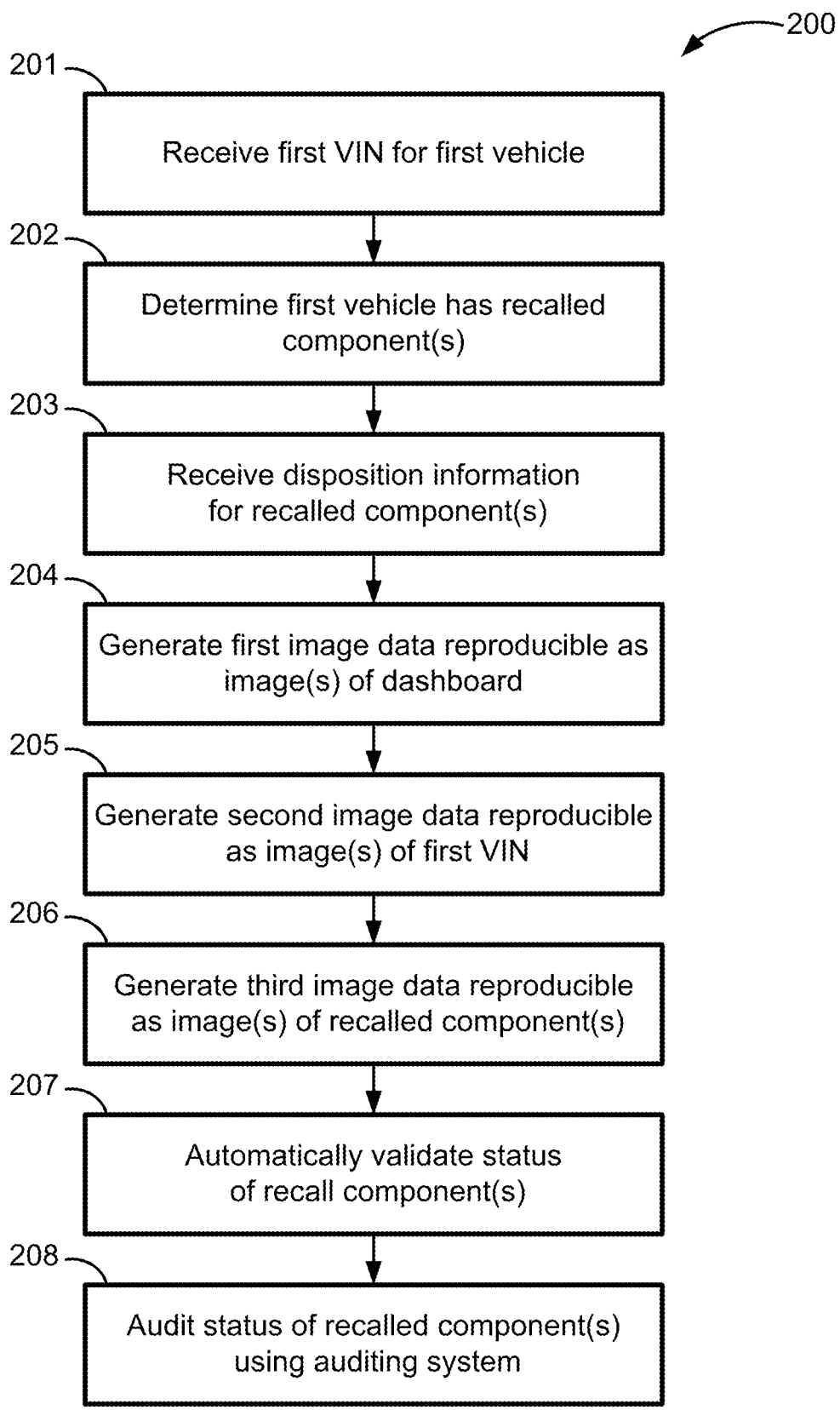
FIG. 2 is a process flow diagram of a method for verifying the status of one or more recalled vehicle components, according to some implementations of the present disclosure.

Referring to FIG. 2, a method 200 for verifying a status of a recalled component (e.g., an airbag) is illustrated. The method 200 can be implementing using a system that is the same as, or similar to, the system 100 described herein.

Step 201 of the method 200 includes receiving information indicative of a first vehicle identification number (VIN) for a first vehicle (e.g., the first VIN 162 of the first vehicle 160). The information indicative of the first VIN can be received by the mobile device 110, the auditing system 130, or both. For example, the first VIN can be received by the mobile device 110, which transmits information describing the first VIN to be received by the auditing system 130. Referring to FIG. 3, in some implementations, step 201 includes displaying a user-interface 300 for inputting a VIN. The user-interface 300 includes a first user-selectable element 302, a second user-selectable element 304, a third user-selectable element 306, and a fourth user-selectable element 308, each of which is displayed on the display device 120 of the mobile device 110. The user-selectable elements 302-306 generally permit the mobile device 110 to receive information regarding a VIN number from a user.

For example, by selecting (e.g., touching) the first user-selectable element 302, a user can manually input the first VIN 162 (e.g., using an alphanumeric keyboard that is displayed on the display 120). Once the user has entered the first VIN 162 using the first user-selectable element 302, the user can select (e.g., touch) the third user-selectable element 306 to verify the inputted VIN (which causes the method to proceed to step 202), or the fourth user-selectable element 308 to cancel or clear the inputted VIN. Selecting (e.g., touching) the second user-selectable element 304 actuates the camera 116 causes images from the camera 116 to be displayed on the display 120. As shown in FIG. 4, this allows the user to take a photo of a VIN sticker 400 on the vehicle (e.g., on the dashboard or the inside of the driver door). The VIN sticker 400 includes the first VIN 162 and a barcode 402 printed thereon. Image data reproducible as an image of the VIN sticker 400 can then be analyzed by the processor 112 to identify the first VIN 162 by decoding the barcode 402. Additionally, or alternatively, the processor 112 can use optical character recognition (OCR) processes or algorithms to determine the first VIN 162 from the image data. Selecting the second user-selectable element 304 to input the first VIN can be faster and less labor intensive than inputting the first VIN manually using the first user-selectable element 302. However, use of the first user-selectable element 302 to input a VIN is advantageous in cases where the VIN sticker 400 is not accessible (e.g., the user is not near the vehicle, the vehicle has been damaged in an accident, etc.)

Step 202 of the method 200 includes determining that the first vehicle has one or more recalled components (e.g., whether the first airbag 164 of the first vehicle 160 is subject to a recall). Specifically, step 202 includes comparing the first VIN 162 received during step 201 to the recall database 136 to determine whether the first vehicle 160 has one or more components subject to a recall. While the recalled component(s) are generally described herein as an airbag, other types of recalled vehicle components are expressly contemplated. For example, the recalled component(s) can include airbag(s), seat belt(s), car seats, tires, brakes, gas pedals, suspensions, or any other vehicle component, or any combination thereof.

Step 202 can be performed by the processor 112 of the mobile device 110, the processor 132 of the auditing system 130, or both. In implementations where step 202 is performed by the processor 112 of the mobile device 110, the mobile device 110 receives information from the recall database 136 in the auditing system 130 and compares the first VIN 162 received during step 201 to the information from the recall database 136. Alternatively, the mobile device 110 can transmit information indicative of the first VIN 162 from the first step 201 to the auditing system 130, and the processor 132 compares the first VIN 162 to the recall database 136. In other implementations, the mobile device 110 and/or the auditing system 130 communicate with a remote server (e.g., a web server hosting a recall website) to determine whether the first vehicle 160 associated with the first VIN 162 is subject to a recall.

Responsive to determining that the first vehicle 160 includes a recalled component (in this example, the one or more recalled airbag components 164), the method 200 proceeds to step 203. However, if the first vehicle 160 does not include a recalled component, the method 200 terminates. Steps 201 and 202 of the method 200 can be repeated one or more times for multiple vehicles until it is determined that one of the VIN numbers received during step 201 is associated with one or more recalled components.

Figures 5A, 5B:
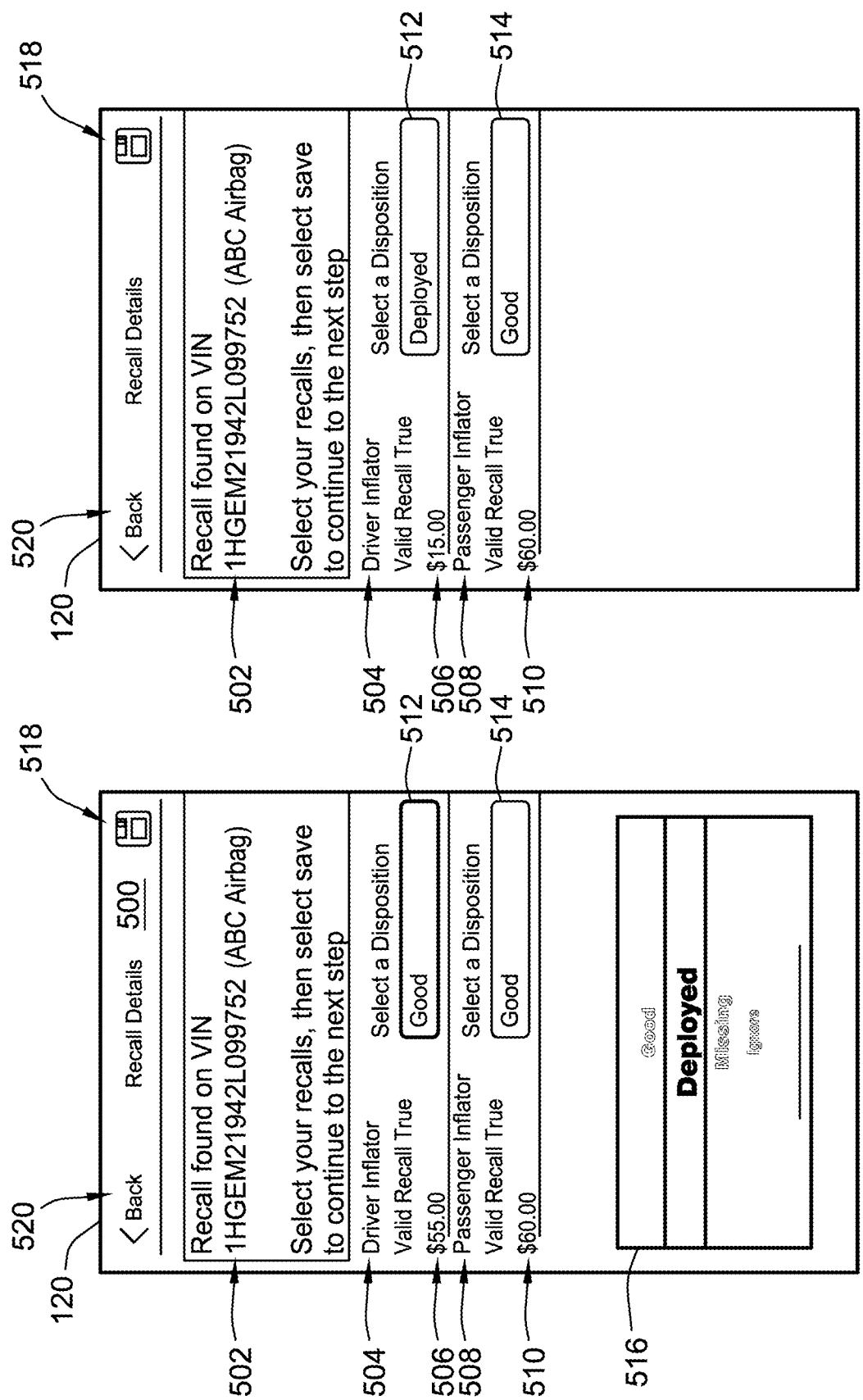
FIG. 5A illustrates user-selectable elements for inputting a plurality of dispositions for one or more recalled components displayed on the display device, according to some implementations of the present disclosure.
FIG. 5B illustrates the user-selectable elements of FIG. 5A subsequent to the selection of a disposition for one or more recalled components, according to some implementations of the present disclosure.

Step 203 of the method 200 includes receiving disposition information for the recalled component(s). Referring to FIGS. 5A and 5B, in some implementations, step 203 includes displaying a user-interface 500 on the display device 120 of the mobile device 110 for receiving disposition information from the user of the mobile device 110. The user-interface 500 includes a VIN indium 502, a first component indicium 504, a first value indicium 506, a second component indicium 508, a second value indicium 510, a first user-selectable element 512, a second user selectable element 514, a drop-down menu 516, a third user-selectable element 518, and a fourth user-selectable element 520.

As shown, the VIN indicium 502 includes alphanumeric text indicative of the first VIN 162 and indicates to the user of the mobile device 110 that the vehicle 160 has one or more recalled components (e.g., airbags). The first component indicium 504 indicates the name of a first recalled component using alphanumeric text. In this example, the first recalled component is a driver inflator, which is a part of the driver-side airbag in the vehicle that causes the airbag to inflate. The first value indicium 506 indicates the value of the first recalled component using alphanumeric text. This monetary value is the value that a vehicle manufacturer will provide as an incentive or compensation for the return of the recalled component. As described in further detail herein, the value of recalled components depends on the disposition of the recalled component. In this example, the disposition of the driver inflator is "good" and the first value indicium 506 indicates that the value is $55. The second component indicium 508 indicates the name of a second recalled component using alphanumeric text. In this example, the second recalled component is a passenger inflator, which is a part of the passenger-side airbag in the vehicle. The second value indicium 510 indicates the value of the second recalled component using alphanumeric text. In this example, the disposition of the passenger inflator is "good" and the first value indicium 510 indicates that the value is $60.

The first user-selectable element 512 and the second user-selectable element 514 permit the user to select one of a plurality of dispositions for the first recalled component (in this example, the driver inflator) and/or the second recalled component (in this example, the passenger inflator). Responsive to selecting one of the first user-selectable element 512 or the second user-selectable element 514 (e.g., by touching the display device 120), the drop-down menu 516 is displayed by the display device 120. As shown, the drop-down menu 516 permits the user to select (e.g., by touching) one of the plurality of dispositions, which includes a good disposition, a deployed disposition, a missing disposition, or an ignore disposition. The "good" disposition indicates that the airbag component has not been deployed. The "deployed" disposition means that the airbag component has been deployed (e.g., responsive to an impact). The "missing" disposition means that the airbag component is missing and no longer present in the vehicle (e.g., the airbag was deployed and then removed). The "ignore" disposition means that the user will not be taking any action (e.g., the user is not going to remove that component). Generally, an airbag with a "good" disposition is more valuable than a "deployed" airbag, and a "deployed" airbag is more valuable than a "missing" airbag. As shown in FIG. 5B, responsive to selecting one of the plurality of dispositions for the first recalled component, the first value indicium 506 is automatically updated. In this example, responsive to indicating that the driver inflator is deployed by using the drop-down menu 516, the first value indicium 506 is updated to indicate the value as $15 instead of the previously displayed $55 value.

After the user has selected a disposition for each of the recalled components, the user can select (e.g., touch) the third user-selectable element 518 to save the provided disposition information, causing the method 200 to proceed to step 204. Alternatively, the user can select the fourth user-selectable element 520 (e.g., by touching) to return to the previous screen (e.g., the user interface 300 of FIG. 3).

Step 204 of the method 200 includes generating first image data reproducible as image(s) of a dashboard of the first vehicle 160 using the camera 116 of the mobile device 110. The first image data generated or obtained during step 204 is associated with a first location of the mobile device 110 (e.g., as determined by the GPS sensor 118) when the first image data is generated or obtained by the camera 116. Additionally or alternatively, in some implementations, the first image data generated or obtained during step 204 is associated with a first time stamp indicative of the time that the first image data was generated or obtained by the camera 116.

Step 205 of the method 200 includes generating second image data reproducible as one or more images of the first VIN 162 of the first vehicle 160 using the camera 116 of the mobile device 110. The second image data generated or obtained during step 205 is associated with a second location of the mobile device 110 (e.g., as determined by the GPS sensor 118) when the second image data is generated or obtained by the camera 116. Additionally or alternatively, in some implementations, the second image data generated or obtained during step 205 is associated with a second time stamp indicative of the time that the second image data was generated or obtained by the camera 116.

Figure 6:
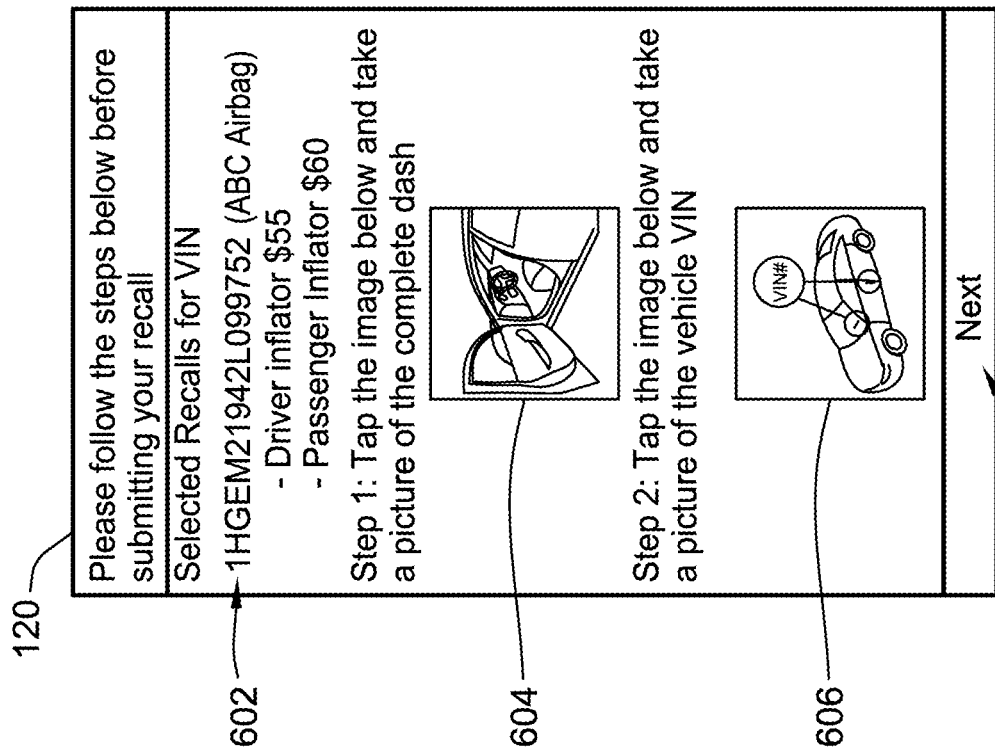
FIG. 6 illustrates a user-selectable element displayed on the display device for causing the mobile device to generate image data reproducible one or more images of a portion of a vehicle, according to some implementations of the present disclosure.

Referring to FIG. 6, in some implementations, step 204 and/or step 205 of the method 200 includes displaying a recall indicium 602, a user-selectable dashboard icon 604, a user-selectable VIN icon 606, and a user-selectable element 608 using the display 120 of the mobile device 110. The recall indicium 602 provides information (e.g., using alphanumeric text) relating to the recalled component determined in step 202 (e.g., the first VIN from step 201, the name of the recalled component, the value(s) of the recalled component from step 203, etc.)

Selecting (e.g., touching) the user-selectable dashboard icon 604 actuates the camera 116 of the mobile device 110 such that the user can take a photograph of a dashboard of the first vehicle (and thereby generate the first image data). Similarly, selecting (e.g., touching) the user-selectable VIN icon 606 causes the processor 112 to actuate the camera 116 of the mobile device 110 such that the user can take a photograph of the VIN of the first vehicle (and thereby generate the second image data). The first image data and/or the second image data is then stored in the memory device 114 of the mobile device 110. Selecting (e.g., touching) the user-selectable element 608 causes the method 200 to proceed to optional step 206. While step 205 is shown in FIG. 2 as occurring after step 204, in some implementations, step 205 can be performed prior to step 204 (e.g., the second image data can be generated or obtained prior to generating or obtaining the first image data). Further, while the method 200 is shown and described herein as including both step 204 and step 205, in some implementations, the method 200 includes step 205 but does not include step 204. In other implementations, the method 200 includes step 204 but does not include step 205.

Step 206 of the method 200 includes generating third image data reproducible as one or images of the recalled components. Like the first image data (step 204) and the second image data (205), the third image data is associated with a location of the mobile device 110 when the third image data is generated or obtained (e.g., based on information from the GPS sensor 118). Additionally or alternatively, the third image data can be associated with a third time stamp indicative of the time that the third image data was generated or obtained by the camera 116 of the mobile device 110.

If the user provides disposition information in step 203 indicating that one or more of the recalled component(s) have a deployed or a missing disposition, the method 200 proceeds to step 206. If the user does not provide disposition information in step 203 indicating that any of the one or more recalled component(s) have a deployed disposition or a missing disposition, the method 200 proceeds from step 205 to step 207 and does not include step 206. While step 206 of the method 200 has been shown and described herein as occurring after step 204 and after step 206, more generally, step 204, step 205, and step 206 can be performed in any sequence (e.g., step 206, then step 204, then step 204).

Figure 7:
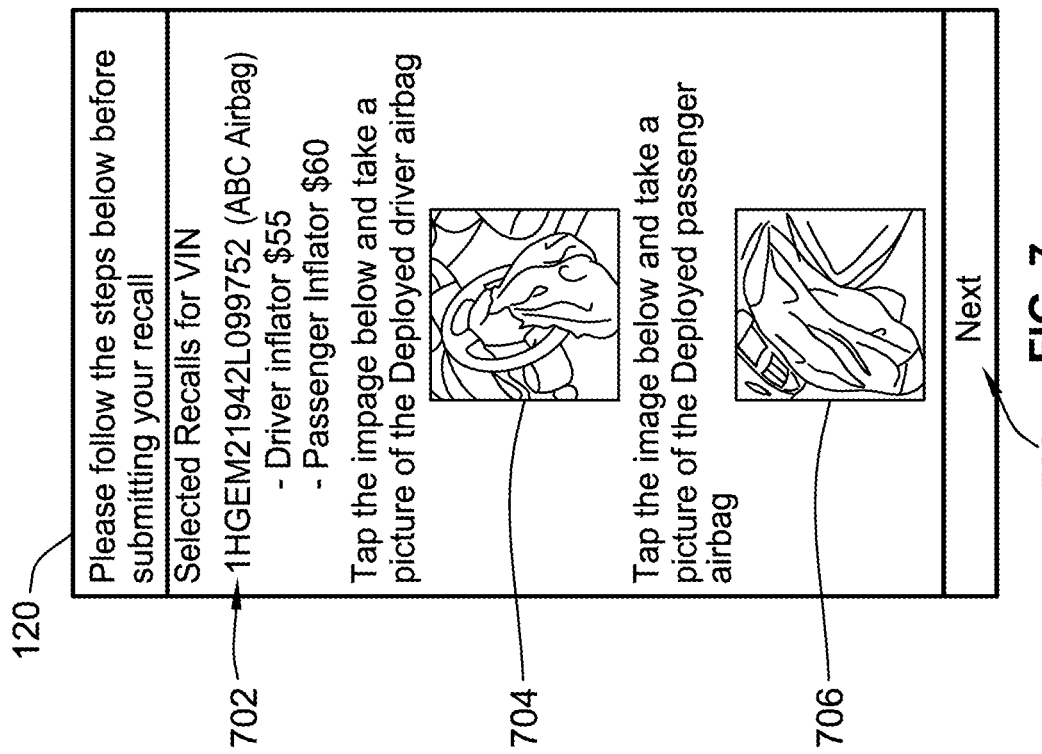
FIG. 7 illustrates a user-selectable element displayed on the display device for causing the mobile device to generate image data reproducible as one or more images of one or more recalled components having a first predetermined disposition, according to some implementations of the present disclosure.

Referring to FIG. 7, responsive to receiving disposition information in step 203 indicating that at least one recalled component has a deployed disposition, step 206 includes displaying a recall indicium 702, a first user-selectable image 704, a second user-selectable image 706, and a user-selectable element 708 using the display 120 of the mobile device 110. The recall indicium 702 is the same as, or similar to, the recall indicium 602 (FIG. 6) described above. Selecting (e.g., touching) the first user-selectable image 704 causes the processor 112 to actuate the camera 116 of the mobile device 110 such that the user can take a photograph of the deployed driver airbag. Similarly, selecting (e.g., touching) the second user-selectable image 706 causes the processor 112 to actuate the camera 116 of the mobile device 110 such that the user can take a photograph of the deployed passenger airbag. These photographs constitute the third image data, which can be stored in the memory device 114 of the mobile device 110. If the user provides information in step 203 indicating that the driver airbag is deployed, but the passenger airbag is not deployed (e.g., the passenger airbag is missing), then the first user-selectable image 704 is displayed and the second user-selectable image 706 is not displayed. Conversely, if the user provides information in step 203 indicating that the passenger airbag is deployed but the driver airbag is not, then the second user-selectable image 706 is displayed and the first user-selectable image 704 is not displayed. The user-selectable element 708 is the same as, or similar to, the user-selectable element 608 (FIG. 6) described above.

Figure 8:
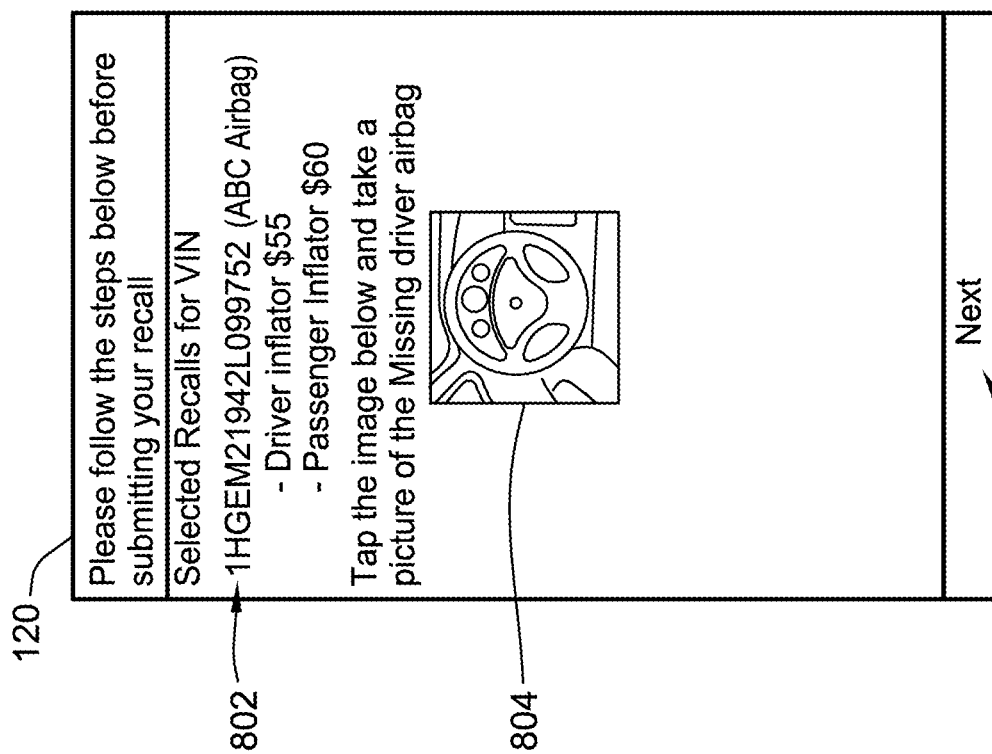
FIG. 8 illustrates a user-selectable element displayed on the display device for causing the mobile device to generate image data reproducible as one or more images of one or more recalled components having a second predetermined disposition, according to some implementations of the present disclosure.

Referring to FIG. 8, responsive to receiving disposition information in step 203 indicating that at least one recalled component has a missing disposition, step 206 includes displaying a recall indicium 802, a first user-selectable image 804, and a user-selectable element 806 displayed on the display 120 of the mobile device 110. The recall indicium 802 and the user-selectable element 806 are the same as, or similar to, the recall indicium 702 and the user-selectable element 708 (FIG. 7) described above. The first user-selectable image 804 is similar to the first user-selectable image 704 and/or the second user-selectable image 706 (FIG. 7) described above in that selecting (e.g., touching) the first user-selectable image 804 causes the processor 112 to actuate the camera 116 of the mobile device 110 such that the user can take a photograph of the missing airbag.

Depending on the disposition information received during step 203, portions of the display in FIG. 7 and portions of the display in FIG. 8 can be deployed simultaneously. For example, if the disposition information indicates that the driver airbag is missing and the passenger airbag is deployed, step 206 includes displaying the recall indicium 702, the first user-selectable image 804 (FIG. 8) and the second user-selectable image 706 (FIG. 7).

Step 207 of the method 200 includes automatically validating the status of the recalled component(s). As described above, airbags generally do not have any unique identifiers from which one can determine the vehicle that the airbag came from the airbag alone. As such, when an individual provides an airbag as part of a recall program that offers compensation for returning the airbag, it is not possible to verify the status of the airbag (whether the airbag came from a vehicle subject to an airbag recall) by examining the airbag alone. Similarly, in the case of a missing recalled airbag, it is not possible to verify the status of the airbag from only a photograph of vehicle with a missing airbag without time-consuming and labor-intensive manual review of the images by a human user, which still may not be able to conclusively verify the status of the airbag.

In some implementations, step 207 includes comparing the location information associated with the first image data (step 204), the location information associated with the second image data (step 205), the location information associated with the third image data (step 206), or any combination thereof, to determine whether the first image data was obtained or generated within a predetermined distance of the second image data and/or the third image data, the second image data was obtained or generated within the predetermined distance of the first image data and/or the third image data, the third image data was obtained or generated within the predetermined distance of the first image data and/or the second image data, or any combination thereof. If distance between the associated locations is greater than the predetermined distance (e.g., more than 3 feet apart, more than 5 feet apart, more than 10 feet apart, more than 25 feet about, more than 50 feet apart, etc.), the validation fails and the method 200 is terminated. For example, if the second image data was generated 200 feet away from the third image data, this likely indicates that the image(s) of the VIN (step 205) are from one vehicle and the image(s) of the recalled component(s) (step 206) are from a different vehicle. Conversely, if the distance between the associated locations is equal to or less than the predetermined distance, the image data is validated. For example, if the first image data (step 204) was generated 1 foot away from the second image data (step 205), this likely indicates that the associated images are of the same vehicle (as opposed to different vehicles).

As described herein, in some implementations, vehicles can be located in a vehicle inventory (e.g., the first vehicle 160 in the vehicle inventory 150 of FIG. 1). In such implementations, step 207 can include receiving or determining a geo-fence boundary of the vehicle inventory. Information describing the geo-fence boundary can be received from the vehicle inventory or publicly available information and can be stored in the memory device 114 of the mobile device 110 and/or the memory 134 of the auditing system 130. Alternatively, the geo-fence boundary can be specified by a user of the auditing system 130. The geo-fence boundary is a virtual perimeter or boundary of the geographic area comprising the vehicle inventory. The geo-fence boundary can have a generally square shape, a generally rectangular shape, a generally triangular shape, a generally circular shape, a generally oval shape, a polygonal shape, or any combination thereof. In these implementations, step 207 includes comparing the location information associated with the first image data (step 204), the location information associated with the second image data (step 205), the location information associated with the third image data (step 206), or any combination thereof, with the geo-fence boundary. If the associated location information of any of the first image data, second image data, or third image data is outside of the geo-fence boundary, the automatic validation fails and the method 200 terminates. Conversely, if the associated location information of each of the first image data, the second image data, and the third image data is within the geo-fence boundary, the validation passes.

In some implementations, step 207 includes comparing the first timestamp associated with the first image data (step 204), the second timestamp associated with the second image data (step 205), the third timestamp associated with the third image data (step 206), or any combination thereof, to determine whether the first image data was obtained or generated within a predetermined time of the second image data and/or the third image data, the second image data was obtained or generated within the predetermined time of the first image data and/or the third image data, the third image data was obtained or generated within the predetermined time of the first image data and/or the second image data, or any combination thereof. If time between the generation of the images is greater than a predetermined period (e.g., more than about 10 seconds, more than about 20 seconds, more than about 30 seconds, more than about 45 seconds, more than about 60 seconds, etc.), the validation fails. For example, if the second image data was generated three minutes after the third image data, this likely indicates that the image(s) of the VIN (step 205) is from one vehicle and the image(s) of the recalled component(s) (step 206) is from a different vehicle (e.g., the user obtained the first image data, walked over to a different vehicle in a different location, and then obtained the second image data). Conversely, if the time between the associated timestamps is equal to or less than the predetermined period, the validation passes. For example, if the first image data (step 204) was generated 5 seconds after the second image data (step 205), this likely indicates that the associated images are of the same vehicle (as opposed to different vehicles) because the user would not have sufficient time to move between different vehicles within the predetermined time period.

Step 207 can include one or both of the comparison of location information described above and the comparison of the time stamps described above, or any combination thereof. For example, step 207 can include comparing the timestamp information associated with the first image data (step 204) and the second image data (step 205) and comparing the location information associated with the third image data (step 206) with the location information associated with the first image data and/or the second image data.

In some implementations, step 207 includes analyzing the third image data (step 206) to automatically identify the presence of recalled component(s) in the generated or obtained image(s) using an object recognition or detection algorithm. The object recognition (OR) algorithm can be a machine learning algorithm (MLA), a deep learning algorithm, a neural network, or any combination thereof. The OR algorithm can be trained using a training data set (e.g., a first series of images that contain recalled components and a second series of images that do not contain recalled components). In addition, the training date for the OR algorithm can be continuously or iteratively updated as the method 200 is repeated for multiple vehicles based on image(s) that are manually verified by a human user. Responsive to identifying that the image(s) of the third image data (step 206) include recalled component(s) using the OR algorithm, the status of the recalled component(s) is validated. Conversely, if the OR algorithm does not detect the presence of recalled component(s) within the image(s), the status of the recalled component(s) is not validated. If the status is not validated, the user can be prompted to repeat step 206 to generate or obtain new image data (e.g., in case the OR algorithm does not detect the recalled component(s) because of poor lighting in the image(s)). Using the OR algorithm as part of the validation in step 207 is advantageous because a human user does not need to manually verify each image that is submitted to confirm that the image(s) in fact show a recalled component.

In other implementations, the OR algorithm described above can be used to verify the disposition information for the recalled component(s) received during step 203. In such implementations, the OR algorithm can be trained (e.g., using images of deployed airbags, images of good airbags, images of missing airbags) to identify not only the presence of the recalled component(s) in the images, but also the disposition of those recalled component(s). In other implementations, the method 200 does not include step 203 and step 207 includes using the OR algorithm to automatically determine the disposition of the recalled component(s) such that the user of the mobile device 110 does not need to manually input the disposition information.

In some implementations, step 207 includes comparing the first image data (step 204), the second image data (step 205), the third image (step 206), or any combination thereof to image data stored in the memory device 114 of the mobile device 110 and/or the memory 134 of the auditing system 130 (FIG. 1). This comparison includes determining whether the image(s) in the first, second and/or third image data are the same as image(s) that were previously submitted using the method 200. If any of the image(s) in the first, second, or third image data are the same as previously submitted images, this means that the user (or another user) has previously made a claim using these image(s) and the current claim is not eligible for compensation, and thus step 207 will not validate the status of the recalled component(s). This prevents the user from reusing the same image(s) to attempt to claim compensation for the same vehicle and/or recalled component(s) multiple times.

In some implementations, step 207 is performed by the mobile device 110 (e.g., using processor 112). Alternatively, in other implementations, the auditing system 130 can perform the automatic validation of step 207 (e.g., using the processor 132). In implementations where the auditing system 130 performs step 207, the first image data (step 204), the second image data (step 205), and the third image data (step 206) are transmitted from the mobile device 110 and received by the auditing system 130 (e.g., stored in the memory 134).

Steps 201-207 of the method 200 can be repeated one or more times for multiple vehicles. For example, while steps 201-207 have been described herein using the first vehicle 160 (FIG. 1), steps 201-207 can be repeated for the second vehicle 170.

Figure 9:
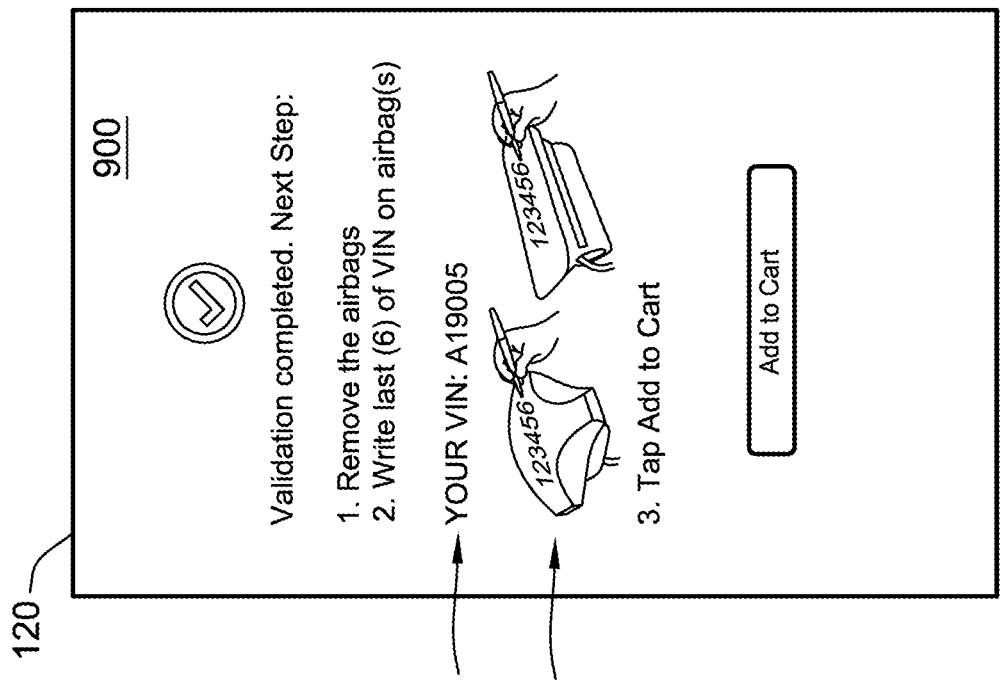
FIG. 9 illustrates indicia displayed on the display device for prompting a user to take a specific action, according to some implementations of the present disclosure.

Referring to FIG. 9, responsive to successfully validating the status of the recalled component(s) during step 207, the method 200 can further include displaying a validation screen 900 on the display 120 of the mobile device 110. The validation screen 900 generally presents information to the user of the mobile device 110 for preparing the recalled component(s) to be sent or returned. As shown, the validation screen 900 includes a first indicium 902 and a second indicium 904. The first indicium 902 includes alphanumeric text indicating the last six characters of the first VIN (step 201) to the user. The second indicium includes image(s) for instructing the user of the mobile device 110 to write the last size characters of the first VIN on the recalled component(s).

In some implementations, the method 200 includes authenticating the user of the mobile device 110 prior to step 201. In such implementations, the user provides credentials (e.g., username and password) via the display 120 of the mobile device 110. For example, one or more user-selectable elements can be displayed on the display 120 of the mobile device 110, and the user can input their credentials by selecting (e.g., touching or clicking on) these user-selectable elements. The mobile device 110 can then authenticate the user by comparing the provided credentials to information in the memory 114 of the mobile device 110 and/or information in the memory 134 of the auditing system 130 (FIG. 1). Authenticating the user prior to steps 201-206 of the method 200 can further aid in the verifying of the status of the recalled component(s) because the information is being provided by a trusted user. Once the user is authenticated, the data generated during steps 201-206 of the method 200 can be associated with the provided credentials for that individual user.

Step 208 of the method 200 includes auditing the status of the recalled component(s) for a plurality of vehicles using the auditing system 130. As described herein, after completion of steps 201-207, the mobile device 110 can transmit information indicative of the first VIN (step 201), the first image data (step 204), the second image data (step 205), the third image data (step 206), or any combination thereof to the auditing system 130. Step 208 permits a user to audit the information provided to the auditing system 130 from the mobile device 110 for each of a plurality of vehicles (e.g., the first vehicle 160 and the second vehicle 170 of FIG. 1).

Referring to FIG. 10, in some implementations, step 208 includes displaying a dashboard 1000 on the display 138 of the auditing system 130. As described above, upon completion of steps 201-207 of the method 200, a claim is submitted from the mobile device 110 to the auditing system 130 (FIG. 1). The dashboard 1000 includes indicia indicative of information for a plurality of claims that is provided to a user of the auditing system 130 (e.g., a different user than the user of the mobile device 110). For example, as shown in FIG. 10, the dashboard 1000 includes a first claim 1010 and a second claim 1020, although more generally the dashboard 1000 can include any number of claims (e.g., 1 claim, 10 claims, 100 claims, 1,000 claims, etc.) The dashboard 1000 also includes indicia indicative of information for each of the claims. In this example, the dashboard 1000 includes indicia 1032-1050.

Indicia 1032-1050 includes a map indicium 1032, a VIN indicium 1034, a vehicle year indicium 1036, a vehicle manufacturer indicium 1038, a vehicle model indicium 1040, an airbag side indicium 1042, a stock number indicium 1044, a price indicium 1046, a business rule indicium 1048, and a deduction indicium 1050. The VIN indicium 1034 provides information (e.g., alphanumeric text) about the VIN for each of the claims 1010 and 1020. The vehicle year indicium 1036 provides information about the year that the vehicle in each of the claims 1010 and 1020 was manufactured. The vehicle manufacturer indicium 1038 provides information about the manufacturer of the vehicle in each of the claims 1010 and 1020. The vehicle model indicium 1040 provides information about the model name of the vehicle in each of the claims 1010 and 1020 was manufactured. The airbag side indicium 1042 provides information about the type of recalled airbag in each vehicle in each of the claims 1010 and 1020 (e.g., a passenger-side airbag or a driver-side airbag). The stock number indicium 1044 provides information about the stock number or part number of the recalled airbag in the vehicles of claims 1010 and 1020. The price indicium 1046 provides information about the price for the recalled airbag in each of the claims

1010 and 1020. As described herein, the price is based on the disposition of the recalled airbag (step 203 of the method 200).

Figure 11:
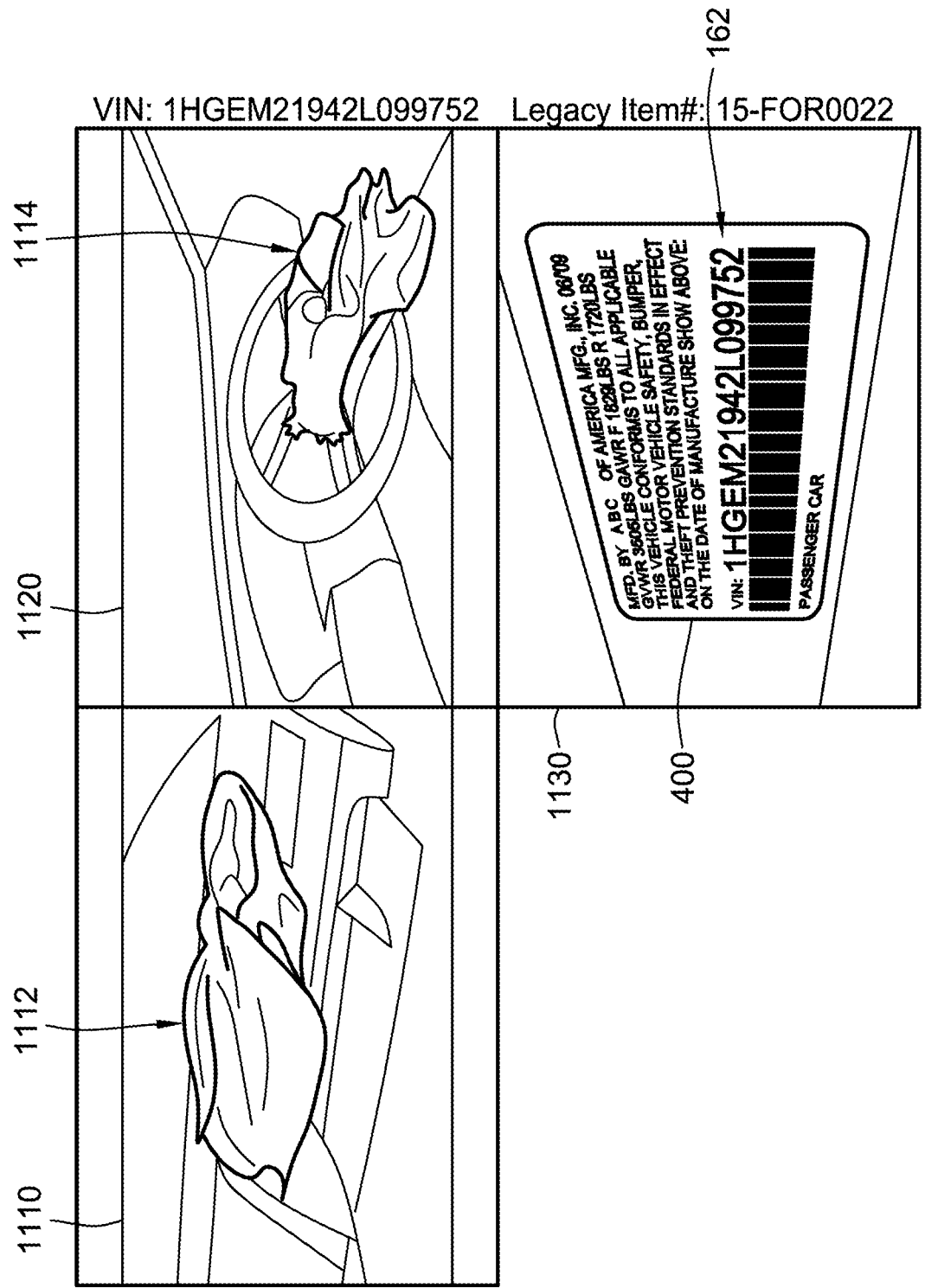
FIG. 11 illustrates exemplary images from a verification file according to some implementations of the present disclosure.

Referring to FIG. 11, in some implementations, selecting (e.g., touching/tapping, clicking) the first claim 1010 and/or the second claim 1020 causes the associated images obtained during step 204, step 205, and/or step 206 to be displayed on the display 138 of the auditing system 130. For example, as shown in FIG. 11, a first image 1110, a second image 1120, and a third image 1130 are displayed on the display 138. In this example, the first image 1110 and the second image 1120 are part of the third image data (step 206), while the third image 1130 is part of the second image data (step 205). The first image 1110 shows a deployed passenger-side airbag 1112. Similarly, the second image 1120 shows a deployed driver-side airbag 1114. The third image 1130 shows the VIN sticker 400 of the vehicle. A user of the auditing system 130 can verify the disposition information provided in step 203 by viewing the first image 1110 and/or the second image 1120. Similarly, the user of the auditing system 130 can verify that the first VIN provided during step 201 is the same as the VIN on the VIN sticker 400 in the third image 1130.

Figure 12:
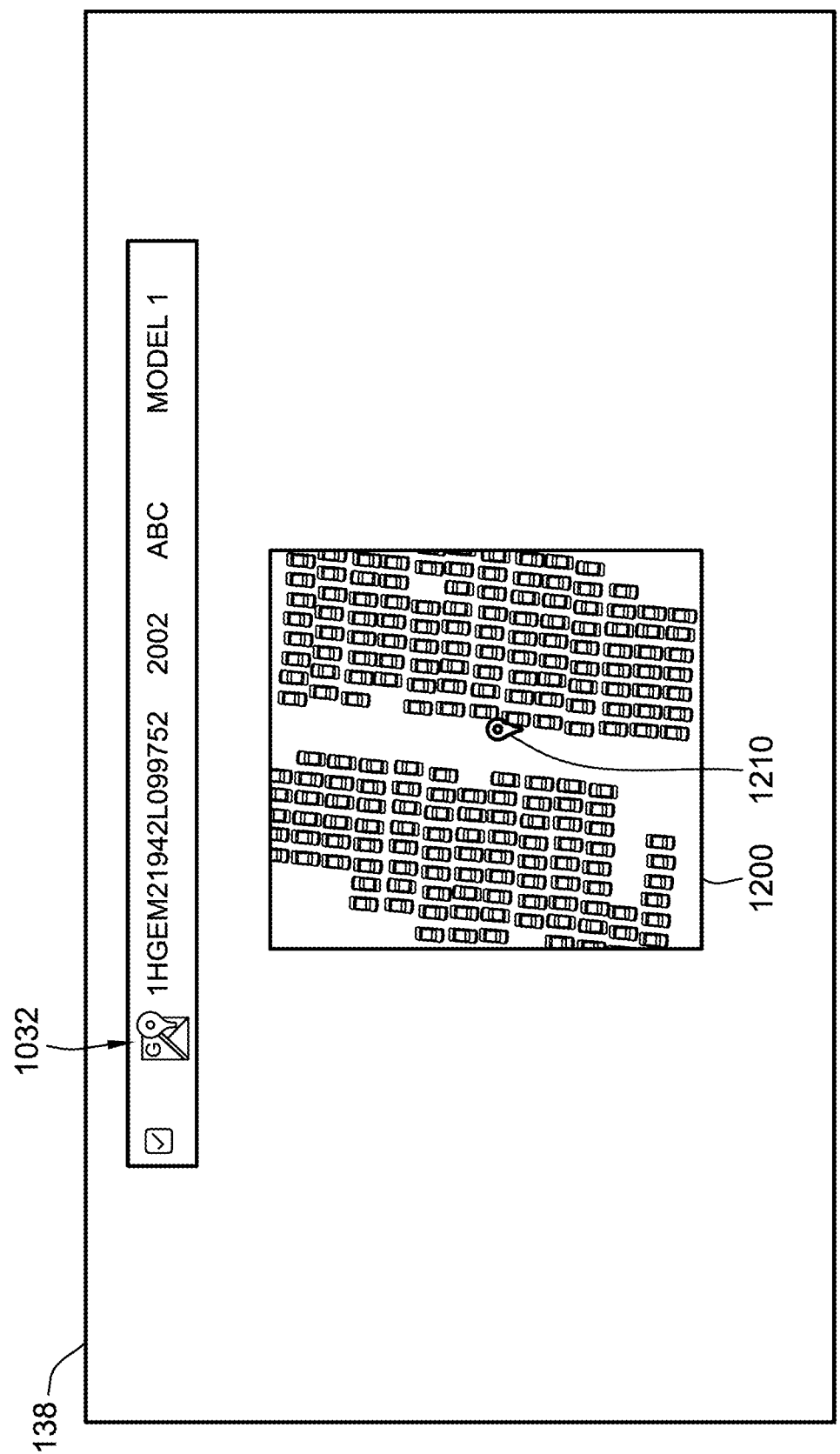
FIG. 12 illustrates a geo-fence boundary image of a vehicle inventory, according to some implementations of the present disclosure.

Referring to FIG. 12, in some implementations, selecting (e.g., touching/tapping or clicking) the map indicium 1032 causes a geo-fence image 1200 to be displayed on the display 138 of the auditing system 130. The geo-fence image 1200 can be an overhead satellite image (e.g., from Google maps or Google Earth). Displaying the geo-fence image 1200 permits the user of the auditing system 130 to verify the location of the vehicle for that claim corresponds with the location of the inventory in which the vehicle is supposed to be located. As shown, the location of the vehicle is indicated by indicium 1210, and is located within the geo-fence image 1200. As such, the user of the auditing system 130 can further verify the status of the recalled component(s) in addition to the automatic validation in step 207.

Figure 13:
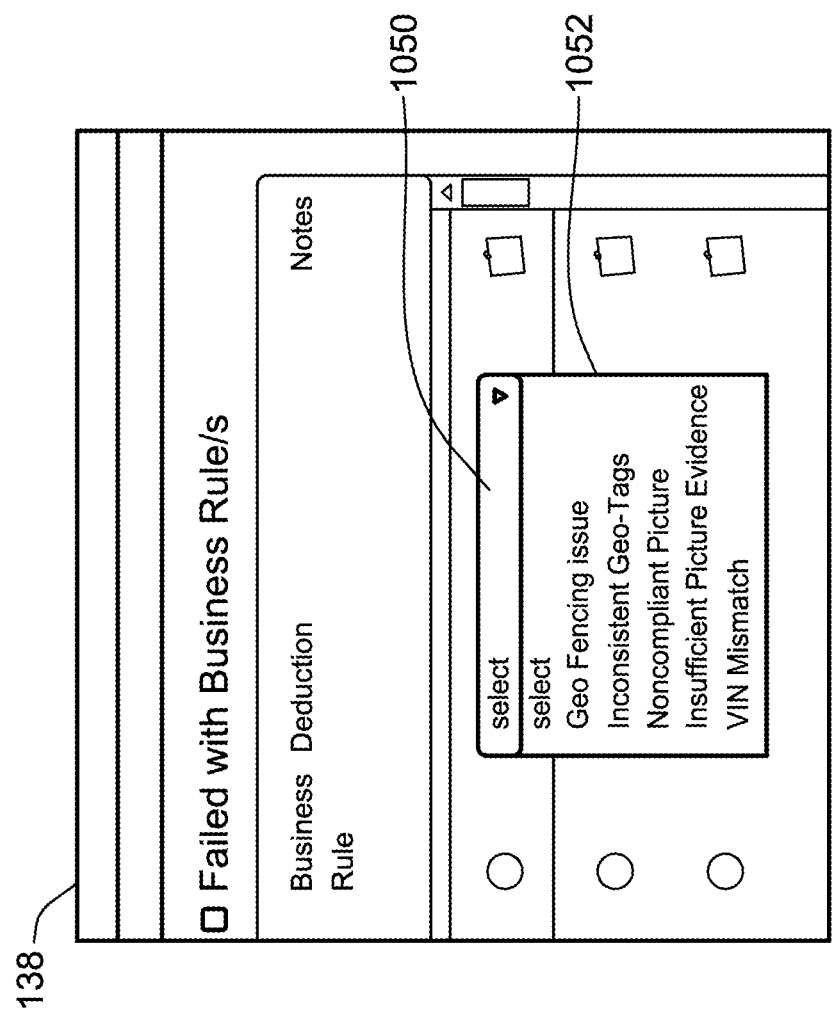
FIG. 13 illustrates a deduction menu of the dashboard of FIG. 10, according to some implementations of the present disclosure.

Referring to FIG. 13, selecting (e.g., touching/tapping or clicking) the deduction indicium 1050 causes a drop-down menu 1052 to be displayed on the display 138 of the auditing system 130. The deduction indicium 1050 and drop-down menu 1052 permits the user to specify a problem with the claim, which either causes the claim to be rejected or reduces the amount of compensation. Using the drop-down menu 1052, the user of the auditing system 130 can indicate a geo-fencing issue (based on viewing the geo-fence image 1200 (FIG. 12) described above), an inconsistent geo-tag issue (e.g., the location for the first image data (step 204) is different than location for the third image data (step 206), that the image(s) in the first, second, or third image data is noncompliant (e.g., the image(s) in the second image data (step 205) do not contain an image of the VIN), that the photograph evidence is insufficient (e.g., the user cannot confirm the disposition of the airbag from viewing the photographs), or that there is a VIN mismatch.

As discussed herein, in some implementations, the vehicle inventory 150 (FIG. 1) is a salvage yard containing hundreds or thousands of vehicles. To obtain as much compensation under the destroy/return programs described herein, it is desirable that the salvage yard operator submit claims for each vehicle in the inventory 150 that is subject to the recall. However, it would be extremely time-consuming for salvage yard operator to manually input or provide the VIN for each vehicle in the salvage yard to identify all of the vehicles subject to the recall. Accordingly, it would be advantageous to provide the vehicle salvage yard operator with an identification of each vehicle in its inventory that contains recalled components. It would also be advantageous to provide an indication of the value of those recalled components to further incentivize and encourage participation in the program.

Figure 14:
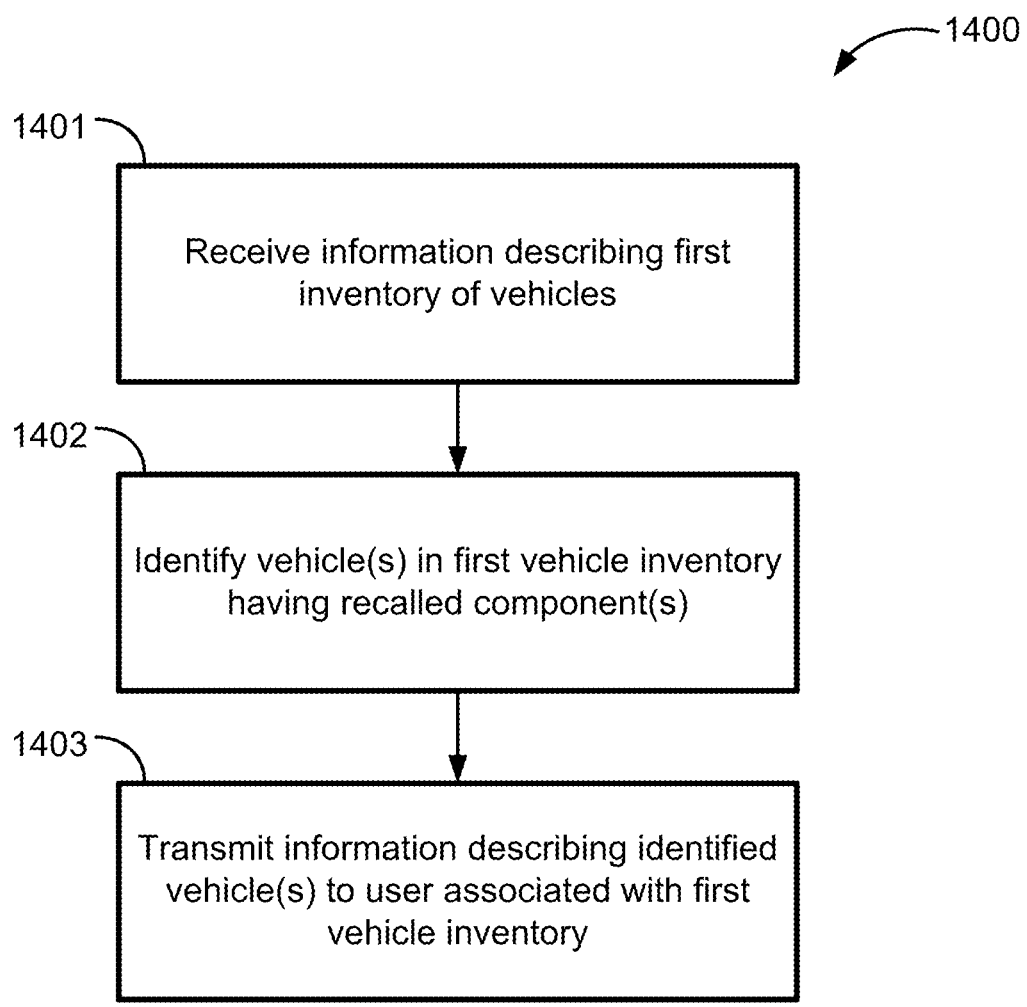
FIG. 14 is a process flow diagram illustrating a method for identifying vehicles subject to a recall in a vehicle inventory, according to some implementations of the present disclosure.

Referring to FIG. 14, a method 1400 for identifying vehicles in a vehicle inventory having recalled component(s) is illustrated. The method 1400 can be implemented using the system 100 (FIG. 1) described herein and can be repeated one or more times for a plurality of vehicle inventories.

Step 1401 of the method 1400 includes receiving information describing a first inventory of vehicles (e.g., vehicle inventory 150). The information describing the first inventory of vehicles can include, for example, at least one unique identifier (e.g., the VIN) for each vehicle in the inventory and a geo-fence boundary for the first inventory of vehicles. This information can be received by and stored in the memory 134 of the auditing system 130. Further, the geo-fence boundary information can be used to verify the status of the recalled component(s) during step 207 of the method 200 (FIG. 2) described herein.

Step 1402 of the method 1400 includes identifying one or more vehicles in the first vehicle inventory having recalled component(s) based on the information received during step 1401. Step 1402 includes comparing the unique identifiers (e.g., VIN's) for each vehicle to the recall database 136 to determine which of the vehicles are subject to a recall.

Step 1403 of the method 1400 includes transmitting information describing the identified vehicle(s) from step 1402 to a user associated with the first vehicle inventory. This information can be used to quickly identify the vehicle(s) in the inventory that are subject to a recall and eligible for compensation, obviating the need to manually check every vehicle in the inventory. The inventory operator can then quickly find each vehicle and perform the steps of the method 200 (FIG. 2) described herein to submit claims for compensation. In some implementations, step 1403 also includes transmitting information indicative of the maximum total compensation that is available for the vehicles identified during step 1402. For example, if 500 vehicles are identified and the value of driver-side and passenger-side airbags with a good disposition are each $60, the maximum total compensation is $60,000 (assuming each airbag has a good disposition and the status can be verified using the method 200). The information indicative of compensation can further incentivize or motivate the operator the vehicle inventory to participate in the program, thus aiding in the removal and/or destruction of recalled vehicle components.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

ALTERNATIVE IMPLEMENTATIONS

Implementation 1. A method of verifying a status of a recalled component, the method includes receiving information indicative of a first vehicle identification number (VIN) associated with a first vehicle, determining that the first vehicle includes a first recalled component based at least in part on the first VIN, receiving first image data generated by a mobile device, the first image data being (i) reproducible as an image of the first VIN associated with the first vehicle and (ii) associated with a first location of the mobile device, receiving second image data generated by the mobile device, the second image data being (i) reproducible as an image of at least a portion of the first recalled component and (ii) associated with a second location of the mobile device, and validating a status of the first recalled component by comparing the first location of the mobile device that is associated with the first image data with the second location of the mobile device that is associated with the second image data.

Implementation 2. The method according to implementation 1, wherein the first recalled component is an airbag.

Implementation 3. The method according to implementation 1 or 2, wherein the validating the status of the first recalled component includes determining that the second location of the mobile device is within a predetermined distance of the first location of the mobile device.

Implementation 4. The method according to any one of implementations 1-3, further comprising receiving, via a human machine interface of the mobile device, information indicative of a disposition of the first recalled component.

Implementation 5. The method according to implementation 4, further comprising displaying information indicative of a value of the first recalled component on a display of the mobile device, the value being associated with the disposition of the first recalled component.

Implementation 6. The method according to any one of implementations 1-5, wherein the image of the at least a portion of the first recalled component includes at least a portion of a dashboard of the vehicle.

Implementation 7. The method according to implementation 6, wherein the first image data is associated with a first timestamp and the second image data is associated with a second timestamp, and the validating includes determining that the second timestamp is within a predetermined time period of the first timestamp.

Implementation 8. The method according to implementation 7, wherein the predetermined time period is two second, five seconds, ten seconds, thirty seconds, one minute, two minutes, or three minutes.

Implementation 9. The method according to any one of implementations 1-8, further comprising receiving information indicative of a second vehicle identification number (VIN) associated with a second vehicle; determining that the second vehicle includes a second recalled component based at least in part on the second VIN; receiving third image data generated by a second mobile device, the third image data being (i) reproducible as an image of the second VIN associated with the second vehicle and (ii) associated with a first location of the second mobile device; receiving fourth image data generated by the second mobile device, the fourth image data being (i) reproducible as an image of at least a portion of the second recalled component and (ii) associated with a second location of the second mobile device; and validating a status of the second recalled component by comparing the first location of the second mobile device that is associated with third image data with the second location of the second mobile device that is associated with the fourth image data.

Implementation 10. The method according to any one of implementations 1-9, wherein the receiving the information indicative of the first VIN includes receiving alphanumeric text via a human machine interface of the mobile device.

Implementation 11. A method of verifying a status of a recalled component, the method comprising: receiving information indicative of a vehicle identification number (VIN) of a vehicle; determining that the vehicle includes a recalled airbag by comparing the VIN to a recall database; causing indicia to be displayed on a display of a mobile device, each of the indicia being indicative of a corresponding one of a plurality of dispositions for the recalled airbag; receiving a selection of a first one of the indicia indicative of a first disposition of the recalled airbag; using a camera of a mobile device, causing first image data reproducible as an image that at least includes the VIN of the vehicle to be generated, using a camera of a mobile device, the first image data being associated with a first location of the mobile device; using the camera of the mobile device, causing second image data reproducible as an image that at least includes a portion of the recalled airbag to be generated, the second image data being associated with a second location of the mobile device; validating a status of the recalled airbag by comparing the second location associated with the second image data with the first location associated with the first image data; and transmitting (i) information indicative of the VIN, (ii) information indicative of the disposition of the recalled airbag, (iii) the first image data, (iv) the second image data, or (v) any combination of (i), (ii), (iii), and (iv) to a remote auditing system.

Implementation 12. The method according to implementation 11, further comprising using the display of the mobile device, causing a value of the recalled airbag to be displayed, the value of the recalled component being associated with the first disposition of the recalled airbag.

Implementation 13. The method according to implementation 11 or 12, wherein the vehicle is located in a vehicle inventory and the validating includes comparing the first location, the second location, or both to a geo-fence boundary of the vehicle inventory.

Implementation 14. The method according to any one of implementations 11-13, wherein the first image data is associated with a first timestamp and the second image data is associated with a second timestamp, and the validating the status includes determining that the second timestamp is within a predetermined time period of the first timestamp.

Implementation 15. The method according to any one of implementations 11-14, wherein the receiving information indicative of the VIN includes receiving alphanumeric text via a human machine interface of a mobile device.

Implementation 16. A method comprising receiving information describing a first inventory of vehicles, the information including at least one unique identifier for each of the vehicles in the first inventory and a geo-fence boundary for the first inventory of vehicles; identifying a first vehicle in the first inventory as being associated with a recalled component by comparing the at least one unique identifier of each of the vehicles in the first inventory to a recall database; transmitting information indicative of the identified first vehicle in the first inventory of vehicles to a third party; receiving, from a mobile device, first image data reproducible as a first image of at least a portion of the first vehicle, the first image data being associated with a first location of the mobile device; and validating a status of the recalled component by comparing the first location associated with the first image data with the geo-fence boundary for the first inventory of vehicles.

Implementation 17. The method according to implementation 16, wherein the recalled component is an airbag.

Implementation 18. The method according to implementation 16 or 17, wherein the unique identifier of each of the vehicles in the first inventory is a vehicle identification number (VIN).

Implementation 19. The method according to any one of implementations 16-18, further comprising receiving, from the mobile device, second image data reproducible as a second image of at least a second portion of the first vehicle, the second image data being associated with a second location of the mobile device.

Implementation 20. The method according to implementation 19, wherein the validating includes determining that the second location is within a predetermined distance of the first location.

Implementation 21. A method comprising receiving information describing a first inventory of vehicles, the information including at least one unique identifier for each of the vehicles in the first inventory and a first geo-fence boundary for the first inventory of vehicles; receiving information describing a second inventory of vehicles, the information including at least one unique identifier for each of the vehicles in the second inventory and a second geo-fence boundary for the second inventory of vehicles; identifying one or more vehicles in the first inventory, the second inventory, or both, as being associated with one or more recalled components; receiving, from a mobile device, (i) image data reproducible as one or more images of at least a portion of a first vehicle, the image data being associated with a location of the first vehicle and (ii) information indicative of a unique identifier for the first vehicle; and automatically validating a status of the one or more recalled components associated with the first vehicle by comparing (i) the associated location of the first vehicle and (ii) the unique identifier of the first vehicle with the information describing the first inventory of vehicles, the information describing the second inventory of vehicles, or both.

Implementation 22. The method according to implementation 21, wherein the automatically validating the status of the one or more recalled components associated with the first vehicle includes determining that the first vehicle is in the first inventory of vehicles by comparing the unique identifier to the information describing the first inventory of vehicles.

Implementation 23. The method according to implementation 22, wherein responsive to determining that the first vehicle is in the first inventory of vehicles, the validating includes determining that the associated location of the first vehicle is within the first geo-fence boundary for the first inventory of vehicles.

Implementation 24. The method according to any one of implementations 21-23, wherein the one or more images of the at least a portion of the first vehicle includes a first image including the unique identifier of the first vehicle, a second image including at least a portion of a dashboard of the first vehicle, a third image including at least a portion of the one or more recalled components of the first vehicle, or any combination thereof.

Implementation 25. The method according to any one of implementations 21-24, wherein the one or more recalled components are airbags.

Implementation 26. The method according to any one of implementations 21-25, further comprising receiving, from the mobile device, information indicative of a disposition of the one or more recalled components of the first vehicle.

It is contemplated that any one or more elements or any portion(s) thereof from any of implementations 1-26 above can be combined with one or more other elements or portion(s) thereof from any of implementations 1-26 to form an implementation of the present disclosure.

What is claimed is:

1. A method of verifying a status of a recalled component, the method comprising:
   selecting a first portion of a user interface of a mobile device to actuate a camera of the mobile device to capture first image data of a portion of a first vehicle;
   responsive to the selecting the first portion, causing the mobile device to store in metadata of the first image data:
   (1) first location data from a GPS sensor and associated with a first location of the mobile device, where the first image data is reproducible as an image of the portion of the first vehicle, and
   (2) a first timestamp indicative of a time that the first image data was captured;
   determining a first vehicle identification number (VIN) associated with the first vehicle based at least in part on the first image data, the determining the first VIN including decoding a barcode printed on the portion of the first vehicle;
   determining that the first vehicle includes a first recalled component based at least in part on the first VIN;
   selecting a second portion of the user interface to actuate the camera to capture second image data of a portion of the first recalled component;
   responsive to the selecting the second portion, causing the mobile device to store in metadata of the second image data:
   (1) second location data from the GPS sensor and associated with a second location of the mobile device, where the second image data is reproducible as an image of at least the portion of the first recalled component, and
   (2) a second timestamp indicative of a time that the second image data was captured; and
   automatically validating a status of the first recalled component by (i) comparing the first location of the mobile device that is stored in the metadata of the first image data with the second location of the mobile device that is stored in the metadata of the second image data, (ii) determining that the second location of the mobile device is within a predetermined distance of the first location of the mobile device, and (iii) determining that the second timestamp is within a predetermined time period of the first timestamp.

2. The method of claim 1, wherein the first recalled component is an airbag.

3. The method of claim 1, further comprising receiving, via the user interface of the mobile device, information indicative of a disposition of the first recalled component.

4. The method of claim 3, further comprising displaying information indicative of a value of the first recalled component on a display of the mobile device, the value being associated with the disposition of the first recalled component.

5. The method of claim 1, wherein the predetermined time period is two seconds, five seconds, ten seconds, thirty seconds, one minute, two minutes, or three minutes.

6. The method of claim 1, further comprising receiving information indicative of a second vehicle identification number (VIN) associated with a second vehicle;
   determining that the second vehicle includes a second recalled component based at least in part on the second VIN;

receiving third image data generated by a second mobile device, the third image data being reproducible as an image of the second VIN associated with the second vehicle, wherein third location data is stored in metadata of the third image data and associated with a first location of the second mobile device;

receiving fourth image data generated by the second mobile device, the fourth image data being reproducible as an image of at least a portion of the second recalled component, wherein fourth location data is stored in metadata of the fourth image data and associated with a second location of the second mobile device; and validating a status of the second recalled component by comparing the first location of the second mobile device that is stored in the metadata of the third image data with the second location of the second mobile device that is stored in the metadata of the fourth image data.

7. The method of claim 1, wherein the automatically validating the status of the first recalled component is performed by a remote auditing system.

8. The method of claim 1, wherein the automatically validating the status of the first recalled component further includes analyzing the second image data using an object recognition algorithm to automatically identify the first recalled component.

9. The method of claim 8, wherein the object recognition algorithm is a trained machine learning algorithm.

10. The method of claim 1, wherein the first portion of the user interface comprises a first user selectable element.

11. The method of claim 10, wherein the second portion of the user interface comprises a second user selectable element.

\* \* \* \* \*

UNITED STATES PATENT AND TRADEMARK OFFICE
CERTIFICATE OF CORRECTION

PATENT NO. : 12,288,218 B2
APPLICATION NO. : 17/349685
DATED : April 29, 2025
INVENTOR(S) : Whiteside et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 323 days.

Signed and Sealed this
Sixteenth Day of December, 2025

John A. Squires
*Director of the United States Patent and Trademark Office*